United States Patent [19]

Ippolito

[11] Patent Number: 4,629,338

[45] Date of Patent: Dec. 16, 1986

[54] SEAL AND BEARING APPARATUS FOR BITS

[75] Inventor: Rodolfo M. Ippolito, Euless, Tex.

[73] Assignee: Dresser Industries, Inc., Dallas, Tex.

[21] Appl. No.: 846,390

[22] Filed: Mar. 31, 1986

[51] Int. Cl.⁴ .......................................... E21B 10/22
[52] U.S. Cl. ..................................... 384/94; 175/371
[58] Field of Search ...................... 175/370, 371, 372; 384/93, 94, 95, 139

[56] References Cited

U.S. PATENT DOCUMENTS

| | | | |
|---|---|---|---|
| 3,193,028 | 7/1965 | Radzimovsky | 175/372 |
| 4,172,502 | 10/1979 | van Nederveen | 384/94 |
| 4,359,111 | 11/1982 | Gonzalez | 175/372 |
| 4,514,098 | 4/1985 | Ippolito | 384/93 |
| 4,569,601 | 2/1986 | Ippolito | 384/93 |

Primary Examiner—Stephen J. Novosad
Assistant Examiner—Terry Lee Melius
Attorney, Agent, or Firm—Fred A. Winans

[57] ABSTRACT

A sealed bearing rock bit for drilling oil wells and the like that includes a spring bearing member rotatably supporting the cutters on the pins of the bit. The resiliency of the spring bearing member on each pin is utilized to bias an annular seal member in a direction to maintain a face-type seal in fluid-tight, sealing engagement preventing loss of lubricant from the bit and preventing the ingress of deleterious material into the bit.

43 Claims, 9 Drawing Figures

SEAL AND BEARING APPARATUS FOR BITS

BACKGROUND OF THE INVENTION

This invention relates generally to improvements in bits for drilling well bores and the like. More particularly, but not by way of limitation, this invention relates to an improved seal and bearing structure for a bit that includes a helical spring, journal bearing rotatably supporting the cutter on the bit and constantly exerting a biasing force on a face seal.

In the process of drilling oil and gas wells and the like, rotary drill bits are attached to the lower end of the drill string and engage the formation to form the well bore as the bit is rotated with weight applied thereto. Manifestly, such bits are exposed to extremely hard use in very demanding environments, and yet must perform for the maximum length of time in order to be suitable for the drilling of well bores One type of such bits is referred to generally as a sealed bearing bit. In these bits, it is the general practice to provide a lubricant reservoir that is connected to the bearing space or cavity located between the pin and the cutter member which is rotatably mounted on the pin. To prevent the loss of lubricant from such cavity and to prevent the ingress of deleterious materials into the cavity, such cavities have been provided with various forms of seals.

The space limitations imposed by the size of the well bores drilled, the cutting structure of the bit, and the physical size thereof demands that such bearings be very compact and that such sealed bearing combinations occupy a minimum amount of space consistent with providing a bearing that will last at least as long as the cutter members themselves.

U.S. Pat. No. 4,514,098 issued Apr. 30, 1985 to Rodolfo M. Ippolito illustrates the use of a helical coil spring to form the journal bearing between the pin of the bit and the bit cutter members. It will be noted that the '098 patent illustrates the use of a seal that is of a type generally referred to as a radial seal. That is, the seal therein forms a seal between the bore of the cutter member and the outer circumference of the pin on which the cutter member rotates.

It will also be noted that the spring bearing of the '098 patent is preferably pressed in a bore in the cutter members and is thus fixed against axial movement relative thereto. While this bearing has worked generally satisfactorily, in some instances, difficulty has occurred due to the tendency of the spring bearing to remain in motion due to inertial forces once it has been set in motion.

Accordingly, an object of this invention is to provide, in one aspect, a new spring bearing and seal combination that includes a face-type seal constantly urged into sealing engagement by the resiliency of the spring bearing, and in another aspect, to securely lock the spring bearing to prevent rotation of the bearing relative to the cutter member.

SUMMARY OF THE INVENTION

This invention provides an improved bit for drilling well bores and the like wherein the bit includes an arm member having a journal bearing pin projecting therefrom and a cutter member having a bore larger than the pin for receiving the pin and forming a bearing and seal space therebetween. The improvement comprises a spring bearing that is located in the space and encircles the pin for rotatably supporting the cutter member on the pin; a seal member engaging the spring bearing; and, said spring bearing and seal member having a combined unstressed length greater than the length of the space urging the seal member into sealing engagement with the arm member.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
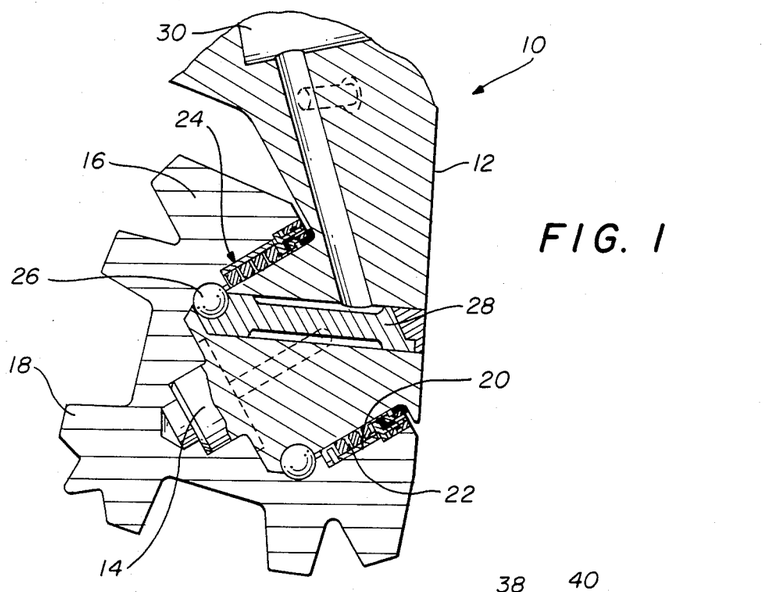
FIG. 1 is a fragmentary cross-sectional view of a portion of a drill bit illustrating the arm, pin and cutter member rotatably supported thereon by a spring bearing that is constructed in accordance with the invention.

Referring to the drawing and to FIG. 1 in particular, shown therein and generally designated by the reference character 10, is a rock bit for drilling oil and gas wells and the like. The rock bit 10 includes three arms 12 (only one is shown in FIG. 1), and each of the arms 12 includes a pin 14 that rotatably supports a cutter member 16. The cutter member 16 includes a plurality of teeth 18 or inserts (not shown) constructed from material such as tungsten carbide if the bit is to be used in very hard formations.

The cutter member 16 has a bore 20 therein forming a space or cavity 22 between the cutter member 16 and the pin 14 for receiving the bearing and seal assembly 24. The cutter member 16 is retained on the pin 14 by a plurality of ball bearings 26 that are located in mating races in the cutter member 16 and in the pin 14. The bearings 26 are inserted through a hole drilled in the arm 12 which has been closed by the plug member 28.

The bit 10 is a sealed bearing bit and includes a lubricant reservoir 30 that is interconnected by appropriate passageways to the cavity 22 between the pin 14 and cutter member 16. The lubricant not only lubricates the bit, but also functions as a pressure compensating agent for a diaphragm (not shown) located in reservoir 30 so that extrusion of the seal is prevented.

Figure 2:
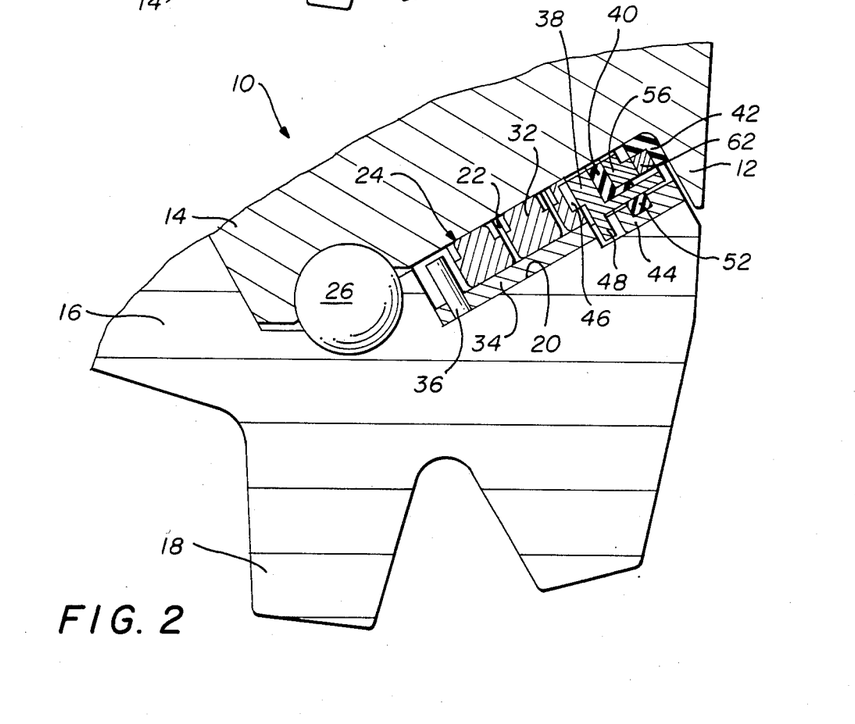
FIG. 2 is an enlarged cross-sectional view of a portion of FIG. 1 illustrating in more detail the arrangement of the spring bearing/seal structure that is constructed in accordance with the invention.

The bearing and seal assembly 24 is shown more clearly in FIG. 2. As shown therein, the bearing and seal assembly 24 is located in the cavity 22 and includes a helical spring bearing member 32 that has its inner surface in engagement with the exterior of the pin 14. The bearing is preferably constructed from spring steel. The assembly also includes a sleeve 34 that is pressed into the bore 20 and has its inner surface in engagement with the exterior of the spring bearing 32. The sleeve 34 carries a stop pin 36 that is in engagement with one end of the spring bearing 32 so that the spring bearing 32 is prevented from rotating forward with respect to the cutter member 16. A moveable stop member 38, rotating seal member 40, stationary seal member 42, and an auxiliary seal member or seal cage 44 are the remaining components of the bearing and seal assembly 24. Each of the components will be described in more detail hereinafter.

The spring bearing 32 is preferably coiled in the counterclockwise direction. Coiling in this direction causes the spring bearing 32 to function as a pump moving lubricant toward the arm 12 along the pin 14.

Figure 3:
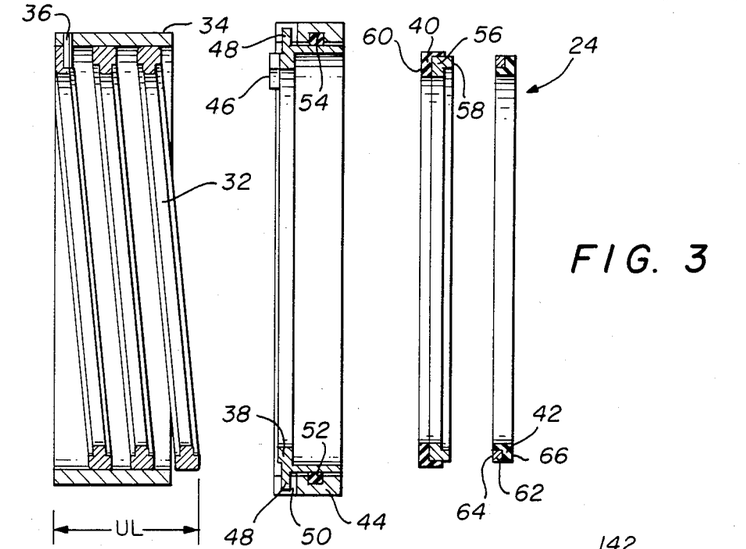
FIG. 3 is a greatly enlarged, semi-exploded view of the components forming the spring bearing and seal arrangement that is constructed in accordance with the invention.

In FIG. 3, the components just mentioned are shown in substantially more detail. As shown therein, the stop member 38 includes a lug 46 that projects in the axial direction therefrom toward the spring 32 and into driving engagement with the end thereof opposite to the end engaged by the stop pin 36. The stop member 38 also includes a pair of radially projecting lugs 48 that are disposed in slots 50 formed in the auxiliary seal member or seal cage 44. The stop member 38 is moveable in the axial direction within the limits of the slots 50.

The auxiliary seal member 44 is pressed into the bore 20 in the cutter member 16. The spring bearing member 32 is driven through the pin 36, the lug 46 on the stop member 38 and the radially projecting lugs 48 by the cutter member 16. The auxiliary seal member 44 also includes an O-ring seal 52 located in an annular groove 54 formed therein. The O-ring seal 52 forms a fluid-tight stationary seal between the auxiliary seal member 44 and the exterior of the moveable stop member 38.

A primary seal in the form of a face seal is provided by the seal members 40 and 42. As illustrated in FIG. 3, the rotating seal member 40 includes an annular seal member 56 having an axial facing sealing surface 58 thereon The seal member 56 is mounted in an annular resilient base portion 60 which is designed to fit snugly within the member 38. To complete the face seal, the stationary seal member 42 includes an annular seal member 62 having a sealing surface 64 thereon that is arranged to mate with the surface 58 forming a fluid-tight dynamic seal therewith. The annular seal 62 is carried by a resilient base member 66 which is designed to fit tightly on the pin 14 so that the seal member 42 is a stationary member while the seal member 40 rotates with the cutter member. If desired, the seal members 42, 40 can be mounted on the pin 14 and stop member 38 respectively with a suitable adhesive or the like.

It should also be pointed out that the unstressed length UL of the spring 32 is greater than the axial length of the cavity 22 wherein the spring bearing 32 is assembled, i.e. it is a compression type spring. Accordingly, an axial force is exerted on the moveable stop member 38 urging the sealing surfaces 58 and 64 of the seal members 40 and 42 together in fluid-tight sealing engagement. Thus, the helical spring bearing 32 serves not only as a bearing for maintaining the rotational relationship between the pin 14 and cutter member 16, but also, due to its resiliency, functions to provide a force or bias urging the surfaces 58 and 64 together, thus sealing the cavity 22 from the external environment.

OPERATION OF THE PREFERRED EMBODIMENT

Figure 4:
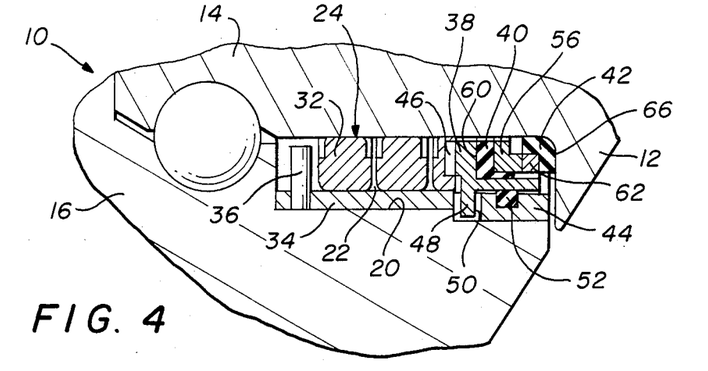
FIGS. 4, 5 and 6 are fragmentary cross-sectional views illustrating the seal illustrated in FIGS. 1–3 in different operating positions.
Figure 5:
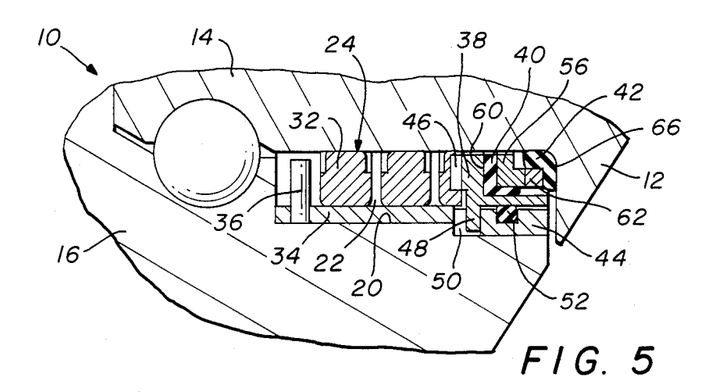
Figure 6:
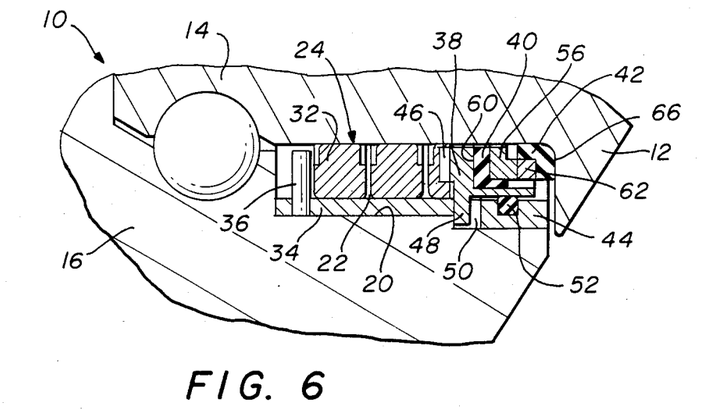

FIGS. 4, 5 and 6 illustrate various positions that the components of the bearing and seal assembly 24 can occupy when installed in the bit 10. FIG. 4 illustrates the preferred running position of the components. It will be noted in FIG. 4 that the radially projecting lugs 48 on the moveable stop member 38 are located in a generally central position axially of the slots 50 formed in the auxiliary seal member 44. The lugs 48 do not have axial contact with either the auxiliary seal member 44 or the end of the sleeve 34. The lugs 48 are in engagement with the auxiliary seal member 44 in the circumferential direction and this contact causes rotation of the spring bearing 32 with the cutter member 16 since the axial lug 46 on the moveable stop member 38 is in engagement with one end of the spring bearing 32.

With the lugs 48 in this position, the spring bearing 32, which as it will be remembered is of the compression type, exerts a biasing force on the moveable stop member 38 urging it in a direction to bring the seal members 40 and 42 into tight sealing engagement. It should be pointed out that the opposite end of the spring bearing 32 is in engagement with the stop pin 36 so that that end of the spring bearing 32 is also driven with the cutter member 16. Since both ends of the spring bearing 32 are in engagement with members rotating with the cutter member 16, no relative movement occurs between the spring bearing 32 and the cutter member 16.

FIG. 5 illustrates the position that the components of the seal and bearing assembly 24 may occupy in the event that wear of the seal faces and/or compression set of the elastomers has occurred on the seal members 40 and 42 or cutter member 16 is mechanically urged inwardly or a pressure differential exists from the cavity 22 to the outside of the bit 10. The lugs 48 are moved axially in the slots 50 until the lugs engage the end of the auxiliary seal member 44. The auxiliary seal member is pressed into the cutter member 16 and thus will restrain the force exerted by the spring bearing 32 on the stop member 38. Overloading of the seal members is therefore avoided.

FIG. 6 illustrates the position of the various components of the seal and bearing assembly 24 in a situation wherein a pressure differential exists from the outside of the bit 10 to the cavity 22 and such pressure moves the lugs 48 in the slots 50 until they engage the end of the sleeve 34. The length of slots 50 have been designed so that the moveable stop member 38 cannot move axially to a position wherein the seal between the members 40 and 42 is not maintained. It should also be noted that the seal members 40 and 42 are urged toward sealing engagement by the spring bearing 32 and by the resiliency of the annular members 60 and 66 in which the seal ring members 56 and 62 are mounted.

From the foregoing detailed description, it will be understood that the bearing and seal assembly 24 does rotatably support the cutter member 16 on the pin 14 and further that the resiliency of the spring bearing member 32 constantly urges the face seal into sealing engagement thus forming a mechanical seal which prevents the loss of lubricant from the cavity 22 and the ingress of deleterious materials thereinto. Furthermore, seal members 56 and 62 can be selected from materials like tungsten carbide or silicon carbide having greater resistance to abrasion than the elastomeric seals commonly used in rock bits. Thus, the life of a bit 10 having the bearing and seal assembly 24 installed therein will be greatly enhanced.

DETAILED DESCRIPTION OF THE EMBODIMENT OF FIG. 7

Figure 7:
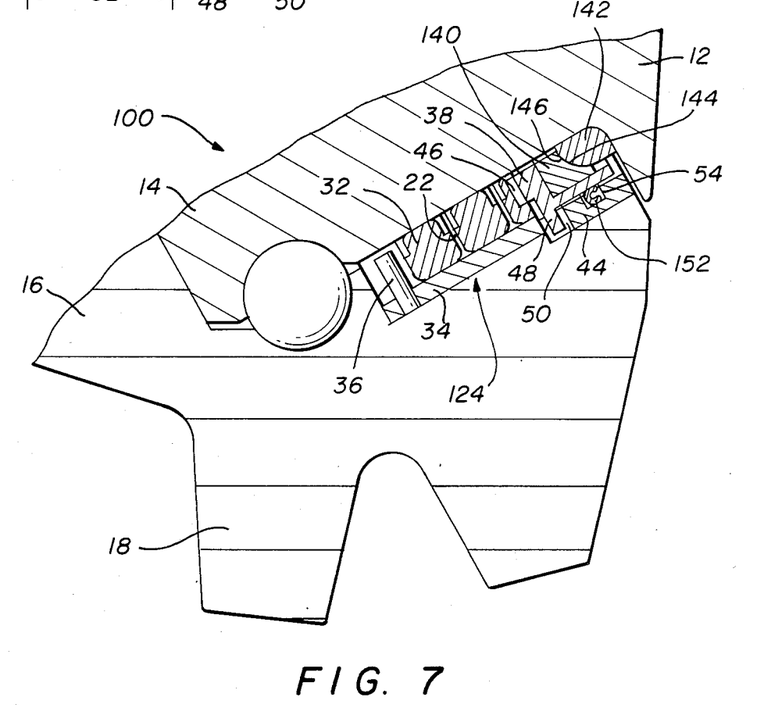
FIG. 7 is a view similar to FIG. 2, but illustrating another embodiment of spring bearing/seal arrangement that is also constructed in accordance with the invention.

FIG. 7 illustrates a modification of the bit 10 which is designated generally by the reference character 100. Many of the components of the bit 100 are identical to those of the bit 10 and are given the same reference characters where the components are the same. The bit 100 includes the arms 12, the pins 14, and cutter members 16 having teeth 18 thereon as described in connection with the bit 10. Each cutter member 16 is retained on the pin 14 by a plurality of ball bearings 26, as also described in connection with the bit 10.

The cavity 22, which is located between the pin 14 and the cutter member 16, includes a seal and bearing assembly that is designated by the reference character 124. The seal and bearing assembly 124 includes the helical metal spring bearing 32 which has one end restrained against rotation relative to the cutter member 16 by the stop pin 36 and the other end restrained against rotation relative to the cutter member 16 by the axially projecting flange 46 of the moveable stop member 38. The stop pin 36 is retained in position by the sleeve 34 which is pressed into the cutter member 16. The spring bearing 32 has its inner periphery in engagement with the exterior of the pin 14 and its outer periphery in engagement with the interior of the sleeve 34 to rotatably support the cutter member 16 on the pin 14.

The auxiliary seal member 44 is pressed into the cutter member 16 and includes slots 50 that are provided, in combination with the sleeve 34, to engage and maintain lugs 48 in a floating position. The lugs 48 are in engagement with the auxiliary seal member 44 in the circumferential direction and this contact causes rotation of the spring bearing 32 with the cutter member 16 since the axial lug 46 on the moveable stop member 38 is in engagement with the end of the spring bearing 32. The stop member 38 extends through the auxiliary seal member 44 and is in stationary sealing engagement with a resilient metal "C" ring 152 which is disposed in the annular groove 54 in the interior of the auxiliary seal member 44.

A rotatable annular seal member 140, which is constructed from metal, is located in the interior of the moveable seal member 38 and is rotatable therewith. The seal member 140 engages a stationary annular seal member 142 which has been positioned on the pin 14 and is also constructed from metal. Rotatable seal member 140 includes a sealing surface 144 that mates with a sealing surface 146 on the seal member 142. Surfaces 144 and 146 are of a generally spherical profile so that the wobbling movement of the cutter 16 during operation of the rock bit can be tolerated without separation of the seal faces.

It can be seen that the resiliency of the spring bearing member 32, as was true in the bit 10, constantly biases the moveable stop member 38 toward the arm 12 and consequently biases the sealing surfaces 144 and 146 into tight sealing engagement. However, and since there are no elastomers holding seal members 140 and 142, the resiliency of the spring bearing member 32 must maintain a biasing force toward seal member 140 regardless of the axial movement of the cutter 16.

The modification of FIG. 7 is to be used where it is desirable to have totally metallic sealing elements. Such seals might be used in extremely hot wells and the like, where it is felt that the resilient portions of the bearing and seal assembly 24 would be subjected to conditions which the elastomeric elements cannot withstand.

It will be understood that the bearing and seal assembly 124 also provides for the rotational support of the cutter member 16 on the pin 14 and further provides a spring bearing member having sufficient resiliency to constantly urge the face seal of the seal and bearing assembly 124 into fluid-tight sealing engagement, preventing the loss of lubricant from the cavity 22 and preventing the ingress of deleterious materials thereinto. Thus, the life of the bit 100 should also be greatly enhanced by having the bearing and seal assembly 124 installed therein.

DETAILED DESCRIPTION OF THE EMBODIMENT OF FIG. 8

Figure 8:
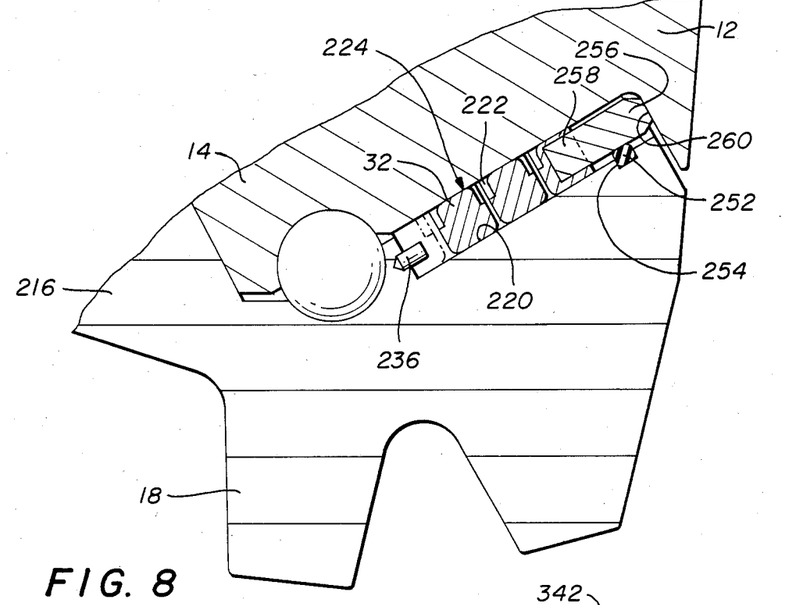
FIGS. 8 and 9 are views similar to FIG. 2, but illustrating other embodiments of spring bearing/seal arrangement that are constructed in accordance with the invention.

The embodiment of FIG. 8 includes a seal and bearing assembly that is generally designated by the reference character 224. The seal and bearing assembly 224 is located in a cavity 222 located between the pin 14 and the cutter member 216. The cavity 222 is provided by a bore 220 that is formed in the cutter member 216. As will be noted from viewing FIG. 8, the seal and bearing assembly 224 is somewhat simplified as compared to the previously discussed embodiments.

A stop pin 236 has been pressed into the cutter member 216 at the end of the bore 220. The stop member 236 engages one end of the helical spring bearing 32 so that the spring bearing 32 rotates with the cutter member 216.

The spring bearing 32 has an unstressed or uncompressed length that is greater than the length of the cavity 222 minus the axial length of an annular seal member 256. Accordingly, the spring bearing 32 exerts an axial force on the annular seal member 256 forcing it in tight sealing engagement with a radial seal surface 260 on the arm 12. The other end of the spring bearing 32 is in engagement with the seal member 256 through the axially projecting flange 258. If desired, the seal member 256 may be constructed from an expendable material such as a polyamide or polyimide resin or even a relatively soft metal such as babbit. The expendable material will provide a tight sealing surface without the need to have an extremely smooth seal face and mating surface sealing face. The seal material will be gradually destroyed as the bit is used.

If desired, the arm 12 adjacent to the seal 256 can be provided with a relatively hard wear surface. For example, the surface can be heat treated or provided with a hard facing of a material such as tungsten carbide. Such surface does not need to be extremely smooth when used with an expendable seal.

A seal for preventing flow past the exterior of the seal member 256 is provided by an annular stationary seal member 252 that is located in a groove 254 formed in the cutter member 216. Note that the embodiment of FIG. 8 differs from all previous embodiments in that no apparent provision is made to prevent forward rotation of the spring 32 with respect to the cutter 216. However, such forward rotation is opposed by the dynamic friction force generated at the sealing surface 260. Should this friction force be inadequate due to the characteristics of the sliding seal material, then a more positive spring driving mechanism can be used such as shown in FIG. 9.

As can also be appreciated from viewing FIG. 8, the simplified form of the seal and bearing assembly 224 occupies less space and requires less components than the previously discussed seal and bearing assemblies. It is equally effective in preventing the escape of lubricant from the bit and the entrance of deleterious materials into the cavity 222.

DETAILED DESCRIPTION OF THE EMBODIMENT OF FIG. 9

Figure 9:
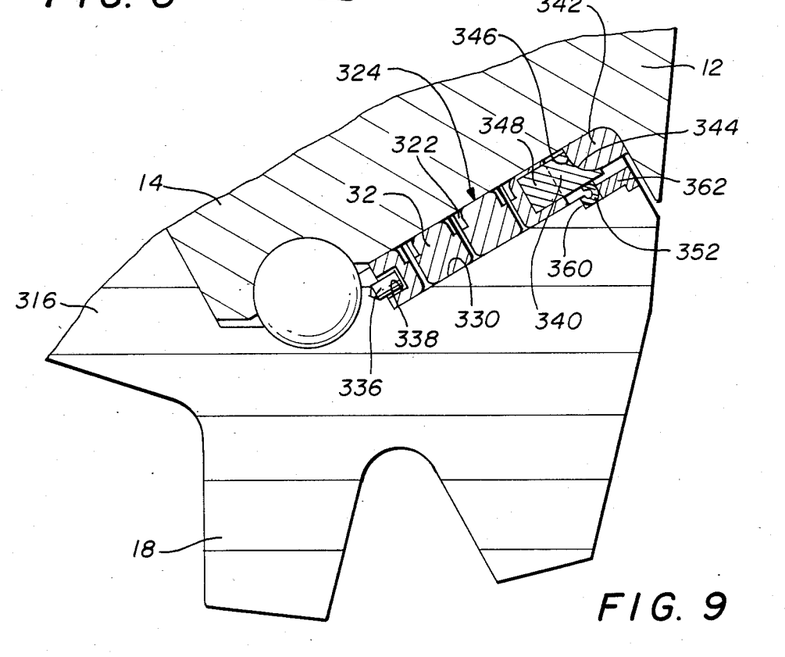

The seal and bearing assembly illustrated in FIG. 9 is generally designated by the reference character 324 and is also constructed in accordance with the invention. As will be recognized, the seal and bearing assembly 324 is a somewhat simplified version of the seal and bearing assembly 124 illustrated in FIG. 7.

As shown in FIG. 9, the seal and bearing assembly 324 is located in a cavity 322 which is formed between the pin 14 and a cutter member 316. A bore 330 in the cutter member 316 defines one side of the cavity 322.

The seal and bearing assembly 324 includes a moveable, annular seal member 340 and a fixed, annular seal member 342 that includes seal surfaces 344 and 346, respectively, that are disposed in sealing engagement. The surfaces 344 and 346 are of generally spherical configuration, as was true of the surfaces 144 and 146 in the seal and bearing assembly 124, to maintain a fluid-tight seal should wobbling occur between the cutter member 316 and the pin 14.

It should again be pointed out that the seal and bearing assembly 324 includes the helical spring bearing member 32 which serves as a bearing between the pin 14 and the cutter member 316. One end of the spring bearing member 32 engages the moveable seal member 340 through a flange 348 protruding axially from the seal member 340. The spring bearing member 32 is of sufficient length and resiliency to continually urge the moveable seal member 340 toward the fixed seal member 342 and thus hold the sealing surfaces 344 and 346 in tight sealing engagement. The opposite end of the spring bearing member 32 is held against rotation relative to the cutter member 316 by a pin 336 which has been pressed into the cutter member 316 in the end of the bore 330 and engages the end coil of the spring 32 through a notch or hole 338 drilled axially in the end coil and of slightly larger diameter than the diameter of pin 336. Pin 336 prevents rotation of spring 32 in both directions.

The bore 330 is slightly enlarged adjacent to the arm 12, providing a shoulder 360 against which a metallic "C" ring seal 352 is located. The seal 352 is in stationary sealing engagement with the exterior of the movable seal member 340. To retain the seal 352 in position, an annular retainer member 362 has been pressed into the bore 330 so that one end thereof is in engagement with the "C" ring seal member 352.

The embodiment of FIG. 9 having the bearing and seal assembly 324 therein operates essentially as did the embodiment of FIG. 7, i.e. with all metallic elements, but as will be appreciated by comparing the two figures, the embodiment of FIG. 9 is somewhat simplified and requires less parts to manufacture.

The seal members described hereinbefore as being metal are preferably constructed from a non-elastomeric material, and depending upon the environmental conditions in which they are used, such non-elastomeric material may be selected from a metal, a ceramet, or a ceramic. "Metal" includes materials usually understood as such. "Ceramet" includes materials such as tungsten carbide, chrome carbide, and silicon carbide. "Ceramic" includes materials such as aluminum and chrome oxides.

The embodiments described in detail hereinbefore are presented by way of example only and it will be understood that many changes and modifications can be made thereto without departing from the spirit or scope of the annexed claims.

What I claim is:

1. In an improved bit for drilling well bores and the like, wherein the bit includes an arm member having a journal bearing pin projecting therefrom and a cutter member having a bore larger than the pin for receiving the pin and forming a seal and bearing space therebetween, the improvement comprising seal and bearing means located in the space for rotatably supporting the cutter member on the pin, said seal and bearing means including:
    a helical spring bearing member located in the space and encircling the pin member; and,
    annular seal means located in said space between the helical spring bearing member and the arm member, said helical spring bearing member and annular seal means having an unstressed axial length parallel to the pin that is greater than the length of the seal and bearing space provided therein, whereby said helical spring bearing member is compressed into said space and exerts a force on said seal means urging said seal means into sealing engagement with said arm member.

2. The bit of claim 1 wherein said helical spring bearing, is coiled counterclockwise.

3. The bit of claim 1 wherein said annular seal means includes:
    a first annular seal member in engagement with said spring bearing; and,
    a second annular seal member carried by the pin in sealing engagement with said first annular seal member.

4. The bit of claim 3 and also including stop means preventing the rotation of the helical spring bearing member relative to the cutter member.

5. The bit of claim 1 and also including a fixed annular seal member encircling the pin and located in sealing engagement with said annular seal means.

6. The bit of claim 5 wherein said seal means and said fixed annular seal members each include mating sealing surfaces comprising a portion of a sphere.

7. The bit of claim 6 and also including means carried by the cutter member for preventing relative rotation between the cutter member and the helical bearing member.

8. The bit of claim 7 wherein the helical bearing member, annular seal means and fixed seal member have a combined unstressed length greater than the space between the pin and cutter member whereby the helical spring bearing member exerts an axial force biasing said annular seal means toward said fixed seal member and maintaining the sealing surfaces thereon in tight sealing engagement.

9. The bit of claim 8 wherein said helical spring bearing is coiled counterclockwise.

10. In an improved bit for drilling well bores and the like, wherein the bit includes an arm member having a journal bearing pin projecting therefrom and a cutter member having a bore larger than the pin for receiving the pin and forming a space therebetween, the improvement comprising journal bearing means located in the space for rotatably supporting the cutter member on the pin, said bearing means including:
  a helical spring bearing member located in the space and encircling the pin member; and,
  stop means engaging said spring bearing member for preventing rotational movement of said spring bearing member relative to one of said pin and cutter member.

11. The bit of claim 10 wherein said helical spring bearing is coiled counterclockwise.

12. The bit of claim 10 wherein said stop means includes:
  first abutment means carried by said cutter member engaging one end of said spring bearing member; and,
  second abutment means carried by said cutter member spaced from said first abutment means and engaging the other end of said spring bearing member, whereby said bearing member is fixed with respect to said cutter member.

13. The bit of claim 12 said first abutment means includes a sleeve member press fitted into said bore and rotatable with said cutter member, said sleeve member having a first abutment member projecting therefrom into engagement with said one end of said spring bearing member.

14. The bit of claim 13 wherein said second abutment means includes an annular abutment member located in said bore member having a second abutment portion engaging the other end of said spring bearing member.

15. The bit of claim 12 wnerein said second abutment means includes an annular abutment member located in said bore and rotatable with said cutter member, said annular abutment member having a second abutment portion engaging the other end of said spring bearing member.

16. The bit of claim 15 wherein said annular abutment member is moveable in the axial direction in said bore.

17. The bit of claim 16 and also including:
  an annular stationary seal member pressed onto said pin and essentially fixed thereto; and,
  an annular moveable seal member attached to said abutment member and rotatable with said cutter member, said cutter seal member sealingly engaging said stationary seal member.

18. The bit of claim 17 wherein said helical spring bearing member is constructed from a resilient material and is, in its relaxed condition, axially longer than the distance between said first and second abutment members whereby said spring bearing member is compressed when located in said space and urges said abutment members relatively apart and urges said seal members relatively together when said spring bearing is located in said bore.

19. The bit of claim 18 wherein:
  said stationary seal member includes an elastomeric body carrying a metal seal ring; and,
  said moveable seal member includes an elastomeric body carrying a metal seal ring in sealing engagement with the seal ring in said stationary seal member.

20. The bit of claim 19 and also comprising:
  an annular seal cage press fitted into the bore of said cutter member between a portion of the annular abutment member of said second abutment means and the arm, said cage including at least one radially oriented recess for receiving a portion of said annular abutment member whereby rotation of the cutter member is transmitted to the annular abutment member of said second abutment means and said cage has an annular recess therein located adjacent to the annular abutment member; and,
  an annular seal member located in said annular recess in sealing engagement with said cage and the annular abutment member.

21. The bit of claim 20 wherein said annular seal member is formed from an elastomer.

22. The bit of claim 21 wherein said radially oriented recess is elongated in the axial direction permitting limited movement of the annular abutment member and moveable annular seal member in the axial direction whereby said metal seal rings remain in sealing engagement in response to the biasing force exerted by said spring bearing member.

23. The bit of claim 18 wherein:
  said stationary seal member comprises an annular metal member having a sealing surface thereon; and,
  said moveable seal member comprises an annular metal member having a sealing surface thereon in sealing engagement with the sealing surface on said stationary seal member.

24. The bit of claim 23 also comprising:
  an annular seal cage press fitted into the bore of said cutter member between a portion of the annular abutment member of said second abutment means and the arm, said cage including at least one radially oriented recess for receiving a portion of said annular abutment member whereby rotation the cutter member is transmitted to the annular abutment member of said second abutment means and said cage has an annular recess therein located adjacent to the annular abutment member; and,
  an annulr seal member located in said annular recess in sealing engagement with said cage and the annular abutment member.

25. The bit of claim 24 wherein said annular seal member comprises a resilient metal ring.

26. The bit of claim 25 whwerein said helical spring bearing is coiled counterclockwise.

27. Seal and bearing means for use in a drill bit wherein the bit has at least one rotatable cutter member journalled on a pin carried by a bit arm member and has a seal and bearing space formed between the pin and cutter member, said seal and bearing means comprising:
  a helical spring bearing member arranged to be located in the space encircling the pin;
  annular seal means arranged to encircle the pin in the space in engagement with said spring bearing member and to form a seal between the cutter member and arm member; and,
  said seal means and bearing member having a combined unstressed length longer than the space whereby said spring bearing member biases said seal means toward the arm member when said seal and bearing means is located in a bit.

28. The seal and bearing means of claim 27 wherein said annular seal means includes:
  an annular moveable seal member arranged to be located in the space in engagement with said spring bearing member and to sealingly engage the arm; and, an annular auxiliary seal member arranged to be carried by the cutter member in sealing engagement with said moveable seal member.

29. The seal and bearing means of claim 28 wherein said annular seal means includes:
an annular moveable seal member arranged to be located in said space in engagement with said spring bearing member;
an annular fixed seal member encircling said pin; and,
said seal members having mating seal surfaces defining a portion of a sphere.

30. The bit of claim 29 wherein said helical spring bearing is coiled counterclockwise.

31. The seal and bearing means of claim 27 wherein said annular seal means includes:
an annular fixed seal member arranged to encircle said pin in the space; and,
an annular moveable seal member engaging said spring bearing member and arranged to encircle the pin and to be moved by said spring bearing member toward said fixed seal member and into sealing engagement therewith.

32. The seal and bearing means of claim 31 and also including an annular auxiliary seal arranged to be carried by the cutter member encircling and in sealing engagement with said moveable seal member.

33. The seal and bearing means of claim 31 wherein each said annular seal member includes:
a metallic ring having a seal surface thereon oriented relatively together; and,
an annular resilient portion supporting each said metallic ring and biasing said surfaces relatively together.

34. The seal and bearing means of claim 33 wherein said seal surfaces are disposed generally perpendicularly to a longitudinal axis of said pin.

35. In an improved bit for drilling well bores and the like, wherein the bit includes an arm member having a journal bearing pin projecting therefrom and a cutter member having a bore larger than the pin for receiving the pin and forming a seal and bearing space therebetween, the improvement comprising seal and bearing means located in the space for rotatably supporting the cutter member on the pin, said seal and bearing means including:
a metallic bearing member located in the space and encircling the pin member; and,
annular metallic seal means located in said space between the metallic bearing member and the arm member, said metallic bearing member and annular metallic seal means having an unstressed length parallel to the pin that is greater than the length of the seal and bearing space provided therein, whereby said metallic bearing member is compressed into said space and exerts a force on said metallic seal means urging said metallic seal means into sealing engagement with said arm member.

36. The bit of claim 35 wherein said annular metallic seal means includes:
a first annular metallic seal member in engagement with said metallic bearing member; and,
a second annular metallic seal member carried by the pin in sealing engagement with said first annular seal member.

37. the bit of claim 36 and also including preventing the rotation of the bearing member relative to the cutter member.

38. In an improved bit for drilling well bores and the like, wherein the bit includes an arm member having a journal bearing pin projecting therefrom and a cutter member having a bore larger than the pin for receiving the pin and forming a seal and bearing space therebetween, the improvement comprising seal and bearing means located in the space for rotatably supporting the cutter member on the pin, said seal and bearing means including:
a helical spring bearing member located in the space and encircling the pin member; and,
annular seal means constructed from an expendable material located in said space between the spring bearing member and the arm member, said helical spring bearing member and annular seal means having an unstressed length parallel to the pin that is greater than the length of the seal and bearing space provided therein, whereby said helical bearing member is compressed into said space and exerts a force on said seal means urging said seal means into sealing engagement with said arm member.

39. The bit of claim 38 wherein said annular seal means includes an annular seal member constructed from a material relatively softer than the arm where engaged by said seal member.

40. The bit of claim 39 wherein said material is babbit.

41. The bit of claim 39 wherein said helical spring bearing is coiled counterclockwise.

42. The bit of claim 39 wherein said material is non-metallic.

43. The bit of claim 42 wherein said material is selected from a group consisting of polyamide and polyimides.

* * * * *